(12) United States Patent
Chung et al.

(10) Patent No.: US 12,519,728 B2
(45) Date of Patent: Jan. 6, 2026

(54) TOE-BASED NETWORK INTERFACE DEVICE INCLUDING MEMORY HIERARCHY STRUCTURE AND OPERATION METHOD THEREOF

(71) Applicant: MangoBoost Inc., Seoul (KR)

(72) Inventors: Yujin Chung, Seoul (KR); Junehyuk Boo, Seoul (KR)

(73) Assignee: MangoBoost Inc., Seoul (KR)

( * ) Notice: Subject to any disclaimer, the term of this patent is extended or adjusted under 35 U.S.C. 154(b) by 0 days.

(21) Appl. No.: 18/673,337

(22) Filed: May 24, 2024

(65) Prior Publication Data

US 2024/0396841 A1    Nov. 28, 2024

(30) Foreign Application Priority Data

May 26, 2023  (KR) .......................... 10-2023-0068676
Apr. 30, 2024  (KR) .......................... 10-2024-0058117

(51) Int. Cl.
*H04L 47/193*    (2022.01)
*H04L 47/125*    (2022.01)

(52) U.S. Cl.
CPC .......... *H04L 47/193* (2013.01); *H04L 47/125* (2013.01)

(58) Field of Classification Search
CPC ............................. H04L 47/193; H04L 47/125
See application file for complete search history.

(56) References Cited

U.S. PATENT DOCUMENTS

| | | | | |
|---|---|---|---|---|
| 7,826,470 | B1* | 11/2010 | Aloni ...................... | H04L 49/90 370/463 |
| 2007/0022212 | A1* | 1/2007 | Fan ........................ | H04L 69/166 709/238 |
| 2008/0285448 | A1* | 11/2008 | Abdulla ................ | H04L 47/125 370/231 |

OTHER PUBLICATIONS

Mario Ruiz et al., Limago: an FPG-based Open-Source 100 GbE TCP/IP Stack, 2019 29th International Conference on Field Programmable Logic and Applications (FPL), Barcelona, Sep. 2019.
Mina TahmasbiArashloo et al., Enabling Programmable Transport Protocols in High-Speed NICs, 17th USENIX Symposium on Networked Systems Design and Implementation (NSDI '20), Santa Clara, CA, USA, Feb. 25, 2020.
Rajath Shashidhara et al., FlexTOE: Flexible TCP Offload with Fine-Grained Parallelism, Mar. 13, 2022.

* cited by examiner

*Primary Examiner* — Hee Soo Kim
(74) *Attorney, Agent, or Firm* — NKL Law; Jae Youn Kim

(57) ABSTRACT

A network interface device and an operation method thereof are disclosed. A network interface device for this purpose may include: a scheduler configured to schedule a TCP event, and to forward the TCP event to the location based on a location reference table indicating a location of TCP connection information corresponding to the TCP event; at least one TCP controller configured to obtain the TCP event from the scheduler, and to control operations for the TCP connection information corresponding to the TCP event; and a memory manager configured to obtain the TCP event from the scheduler, to determine whether to perform TCP operations for the TCP connection information corresponding to the TCP event, and to transmit a swapping request signal to the scheduler requesting to move the TCP connection infor- (Continued)

mation to a TCP controller among the at least one of the TCP controllers based on the result of the determination.

20 Claims, 10 Drawing Sheets

TOE-BASED NETWORK INTERFACE DEVICE INCLUDING MEMORY HIERARCHY STRUCTURE AND OPERATION METHOD THEREOF

CROSS-REFERENCE TO RELATED APPLICATION(S)

This application claims benefit of priority to Korean Patent Application Nos. 10-2024-0058117, filed on Apr. 30, 2024, and 10-2023-0068676, filed on May 26, 2023, in the Korean Intellectual Property Office, the disclosures of which are incorporated herein by reference in their entirety.

BACKGROUND

The present disclosure relates to a network interface, more specifically, relates to a TCP/IP Offload Engine (TOE) based network interface device, an operation method thereof including a memory hierarchy structure.

The application of big data or artificial intelligence is expanding and the use of over-the-top (OTT) services becomes almost routine. As a result, there is an urgent need to improve the performance of various devices connected through the network, such as user terminals, web servers, web application servers (WAS), storage servers, and database servers, in terms of data processing volume and processing speed.

Specifically, network devices may require enormous system resources to perform data communication based on the Transmission Control Protocol/Internet Protocol (TCP/IP) Protocol in a high-speed network environment. For example, when a web server performs data communication with a large number of user terminals over a network, the web server's central processing unit (CPU) may experience a significant load to perform TCP/IP operations. This may cause performance degradation and communication delays throughout the web server.

Thus, various technologies have emerged to distribute the load of the CPU on network devices, among which the TCP/IP Offload Engine (TOE) technology is a technology that offloads the CPU load by implementing the transport layer and network layer, which were previously implemented in software in TCP/IP, in separate hardware (e.g., Network Interface Card). TOE technology to implement high-speed network environments requires efficient and flexible hardware or software design, such as high performance and multiple connection support.

SUMMARY

The present disclosure is intended to provide a TOE based network interface device, an operation method thereof including a memory hierarchy structure. Specifically, various embodiments of the present disclosure are directed to TOE-based network interface devices and operation methods thereof including a memory hierarchy structure capable of flexibly and efficiently managing TCP connection information by distributing it across small but fast memory and slow but large capacity memory.

To resolve the above-mentioned technical issues, according to an example embodiment of the present disclosure, a network interface device may include: a scheduler configured to schedule a TCP event, and to forward the TCP event to the location based on a location reference table indicating a location of TCP connection information corresponding to the TCP event; at least one TCP controller configured to obtain the TCP event from the scheduler, and to control operations for the TCP connection information corresponding to the TCP event; and a memory manager configured to obtain the TCP event from the scheduler, to determine whether to perform TCP operations for the TCP connection information corresponding to the TCP event, and to transmit a swapping request signal to the scheduler requesting to move the TCP connection information to a TCP controller among the at least one of the TCP controllers based on the result of the determination.

In addition, according to an example embodiment of the present disclosure, a method of operating an electronic device may include: scheduling a TCP event by a scheduler; forwarding the TCP event to the location based on a location reference table indicating a location of TCP connection information corresponding to the TCP event by the scheduler; obtaining the forwarded TCP event by at least one TCP controller or memory manager; controlling operations for the TCP connection information corresponding to the TCP event by the at least one TCP controller; determining whether to perform TCP operations for the TCP connection information corresponding to the TCP event by the memory manager; and transmitting a swapping request signal to the scheduler requesting to move the TCP connection information to a TCP controller among the at least one of the TCP controllers based on the result of the determination by the memory manager.

In addition, according to an example embodiment of the present disclosure, a computer-readable recording medium on which a program for performing the above methods is recorded may be included.

According to various embodiments of the present disclosure, a TOE-based network interface device that offloads TCP/IP operations from a CPU may support a memory hierarchy capable of distributing TCP connection information across multiple memories for flexible and efficient management.

According to various embodiments of the present disclosure, based on a memory hierarchy that may efficiently utilize the advantages of small but fast memory (e.g., SRAM) (hereinafter referred to as first memory) and slow but large capacity memory (e.g., DRAM) (hereinafter referred to as second memory), TCP connection information that requires TCP operations to be performed may be stored in the first memory, which is small but fast, and TCP connection information that does not require immediate TCP operations to be performed may be stored in the second memory, which is slow but large capacity. Thus, by overcoming the limitation that a large number of TCP connection information cannot be supported due to SRAM size limitations when TCP connection information is stored only in SRAM for high performance previously, it is possible to support a large number of TCP connections with a large memory and still process TCP/IP operations with high performance.

According to various embodiments of the present disclosure, when a network interface device is swapping-in or -out TCP connection information between the first memory and the second memory to perform TCP operations, the forwarding of the corresponding TCP event to the corresponding location (e.g., a TCP controller or memory manager) may be delayed for a predetermined time by using a pending queue. In this way, when TCP connection information is being moved between memories, the corresponding TCP events may be prevented from being routed to the wrong location and performance degradation may be avoided. In addition, according to various embodiments of the present disclosure, a network interface device may improve performance under a memory hierarchy since it may schedule and process the next TCP event that is not being moved while the TCP event corresponding to the moving TCP connection information is stored in a pending queue.

The effects of the exemplary embodiments of the present disclosure are not limited to those described above, and other effects not described may be clearly derived and understood by persons of ordinary skill in the art to which the exemplary embodiments of the present disclosure belong from the following description. In other words, unintended effects of implementing the exemplary embodiments of the present disclosure may also be derived from the exemplary embodiments of the present disclosure by persons of ordinary skill in the art.

DETAILED DESCRIPTION

Figure 1:
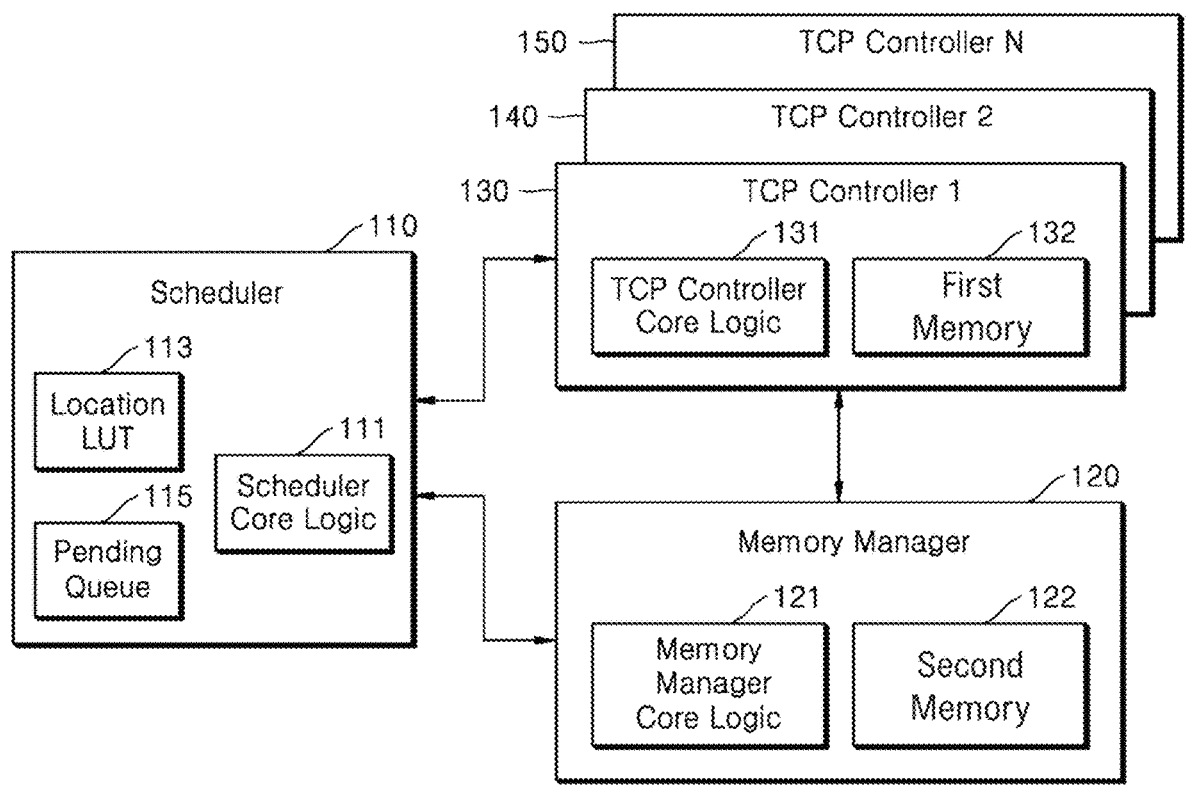
FIG. 1 is a block diagram schematically illustrating a network interface device according to an example embodiment of the present disclosure.

Hereinafter, embodiments of the present disclosure will be described in detail with reference to the drawings so that those skilled in the art to which the present disclosure pertains can easily practice the invention. However, the present disclosure may be implemented in various forms and is not limited to the example embodiments described herein.

In relation to the description of the drawings, like or similar reference numerals may be used for like or similar components. Moreover, in the drawings and the related description, well-known functions and configurations may be omitted for clarity and conciseness.

FIG. 1 is a block diagram schematically illustrating a network interface device according to an example embodiment of the present disclosure.

Referring to FIG. 1, the network interface device 100 may include a scheduler 110, a memory manager 120, and at least one TCP controller 130, 140, or 150.

According to an example embodiment of the present disclosure, the network interface device 100 may further include separate modules for supporting other network protocols besides TCP/IP, such as Internet Control Message Protocol (ICMP), Address Resolution Protocol (ARP), and the like. The network interface device 100 may include additional components in addition to the components shown, or may omit at least one of the components shown.

According to an example embodiment of the present disclosure, the scheduler 110, the memory manager 120, and the at least one TCP controller 130, 140, or 150 may include units implemented in hardware, software, or firmware, and, for example, may be used interchangeably with terms such as logic, logic blocks, components, or circuits. The scheduler 110, the memory manager 120, and the at least one TCP controller 130, 140, or 150 may collectively comprise a component, or may be a minimal unit of a component or a part thereof that performs one or more functions. According to an example embodiment of the present disclosure, the scheduler 110, the memory manager 120, and the at least one TCP controller 130, 140, or 150 may be implemented in various integrated circuit forms, such as a field-programmable gate array (FPGA) or an application-specific integrated circuit (ASIC).

According to an example embodiment of the present disclosure, the scheduler 110 may include a scheduler core logic 111, a location reference table 113, and a pending queue 115. The scheduler core logic 111 may perform various operations of the scheduler 110, such as storing TCP connection information and TCP events in the location reference table 113 and the pending queue 115, respectively or controlling them. Thus, according to an example embodiment of the present disclosure, performing operations by the scheduler 110 may be disclosed interchangeably with performing operations by the scheduler core logic 111.

According to an example embodiment of the present disclosure, the memory manager 120 may include a memory manager core logic 121 and a second memory 122. The second memory 122 may include various types of large-capacity memory, including, but not limited to, a dynamic random access memory (DRAM) and a high bandwidth memory (HBM). The memory manager core logic 121 may perform various operations of the memory manager 120, such as storing TCP connection information in the second memory 122 and controlling it. Thus, according to an example embodiment of the present disclosure, performing operations by the memory manager 120 may be disclosed interchangeably with performing operations by the memory manager core logic 121.

According to an example embodiment of the present disclosure, the at least one TCP controller 130, 140, or 150 may each include a TCP controller core logic 131 and a first memory 132. The first memory 132 may include various types of high-speed or high-performance memory, including, but not limited to, a static random access memory (SRAM). In the present disclosure, the TCP controllers 130, 140, or 150 may be disclosed interchangeably with a Flow Processing Core (FPC). Each of the TCP controller core logic 131 may perform various operations of the TCP controller 130, 140, or 150, such as storing TCP connection information in the first memory 132 and controlling it. Thus, according to an example embodiment of the present disclosure, performing operations by the TCP controller 130, 140, or 150 may be disclosed interchangeably with performing operations by the respective TCP controller core logic 131. In the present disclosure, the TCP controller core logic 131 may be disclosed interchangeably with the FPC core logic.

According to an example embodiment of the present disclosure, the network interface device 100 may store TCP connection status in a structure called TCP connection information (or Transmission Control Block, TCB). The network interface device 100 may generate or update the TCP connection information corresponding to a TCP event when the TCP event occurs. The TCP connection information will be described in detail below with reference to Table 1. The TCP events may include a user call event, a reception event, and a timer event.

According to an example embodiment of the present disclosure, the network interface device 100 may determine whether it is necessary to perform TCP operations based on the generated or updated TCP connection information. For example, based on the generated or updated TCP connection information, the network interface device 100 may determine that it is necessary to immediately perform TCP operations when the network interface device 100 determines that it is a situation where a TCP ACK or a TCP packet may be received by the receiver, but may determine that it is not necessary to immediately perform TCP operations when the network interface device 100 determines that it is a situation where a TCP ACK or a TCP packet may not be received by the receiver. According to an example embodiment of the present disclosure, the TCP operations may include, but not limited to, flow control operations and congestion control operations. For example, the network interface device 100 may perform congestion control operations, such as updating a congestion window value using information such as SND.CWND, SND.SSTHRESH, countDupAck, etc. among the updated TCP connection information. The network interface device 100 may update the TCP connection information to reflect the result of performing the TCP operations.

According to an example embodiment of the present disclosure, the network interface device 100 may store TCP connection information that requires frequent TCP operations to be performed in the first memory 132 having a high memory access speed, and store other TCP connection information in the second memory 122 having a relatively low access speed but a large capacity.

According to an example embodiment of the present disclosure, the first memory 132 may be provided in each of the TCP controller 130, 140, or 150. The TCP controller 130, 140, or 150 may obtain TCP events corresponding to TCP connection information stored in its first memory 132 from the scheduler 110, and may update the TCP connection information when performing TCP operations corresponding to the TCP connection information.

According to an example embodiment of the present disclosure, the second memory 122 may be provided within the memory manager 120. The memory manager 120 may obtain a TCP event corresponding to the TCP connection information stored in the second memory 122 from the scheduler 110, and may update the TCP connection information corresponding to the TCP event. The memory manager 120 may determine, based on the updated TCP connection information, whether it is a situation to perform TCP operations for the TCP connection corresponding to the TCP event. When determining that it is a situation to perform TCP operations, the memory manager 120 may initiate a procedure to move the corresponding TCP connection information to the first memory 132. After the TCP connection information is moved to the first memory 132, the TCP controller controlling the first memory 132 may perform TCP operations and update the TCP connection information based on the results of the TCP operations.

As described above, the network interface device 100 may include a memory hierarchy structure that distributedly stores TCP connection information in the first memory 132, which is small but fast, and the second memory 122, which is slow but large capacity, and controls it. According to an example embodiment of the present disclosure, based on the memory hierarchy structure that can efficiently utilize the advantages of the first memory 132, which is small but fast and the second memory 122, which is slow but large capacity, the network interface device 100 may store TCP connection information that requires to perform TCP operations in the first memory 132, which is small but fast, and store TCP connection information that does not require to perform TCP operations immediately in the second memory 122, which is slow but large capacity. Thus, according to an example embodiment of the present disclosure, when TCP connection information is stored only in the first memory 132 for high performance previously, there is a limitation that the first memory 132 cannot support a large number of TCP connection information due to the size limitation of the first memory 132. But by overcoming this limitation, it is possible to support a large number of TCP connections with a large memory and still possible to process TCP/IP operations with high performance.

According to an example embodiment of the present disclosure, when scheduling TCP events, the scheduler 110 may forward a TCP event to a corresponding TCP controller or memory manager where the corresponding TCP connection information is stored. To do so, the scheduler 110 may include a location reference table (Location LUT) 113 that indicates the location of the TCP connection information corresponding to the TCP event. The scheduler 110 may forward the TCP event to a location where corresponding TCP connection information is stored based on the location reference table 113. The scheduler 110 may manage the relocation of TCP connection information between the first memory 132 and the second memory 122, and store the current location of the TCP connection information in the location reference table 113. The location reference table and the operations of the scheduler 110 based thereon will be described later with reference to FIGS. 2 through 10. The TCP controller or memory manager obtaining the TCP event from the scheduler 110 may update the TCP connection information corresponding to the TCP event as described above.

According to an example embodiment of the present disclosure, the scheduler 110 may store the corresponding TCP event in the pending queue 115 when the TCP connection information is being moved between the first memory 132 and the second memory 122 to perform TCP operations. The TCP event input to the pending queue 115 may be output after a predetermined delay. When the corresponding TCP event is output from the pending queue 115 after the predetermined delay, the scheduler 110 may forward the TCP event to the location where the TCP connection information corresponding to the output TCP event is stored. If the TCP connection information is still being moved, the scheduler 110 may store the TCP event back into the pending queue 115.

According to an example embodiment of the present disclosure, when the TCP connection information is being moved to perform TCP operations, the pending queue 115 may be utilized to delay the forwarding of the TCP event by a predetermined time period to prevent the TCP event from being routed to the wrong location, thereby preventing performance degradation. In addition, during the time that the TCP event corresponding to the TCP connection information that is being moved is stored in the pending queue 115, the next TCP event that is not being moved may be scheduled and processed, which may also improve performance under the memory hierarchy structure.

Figure 2:
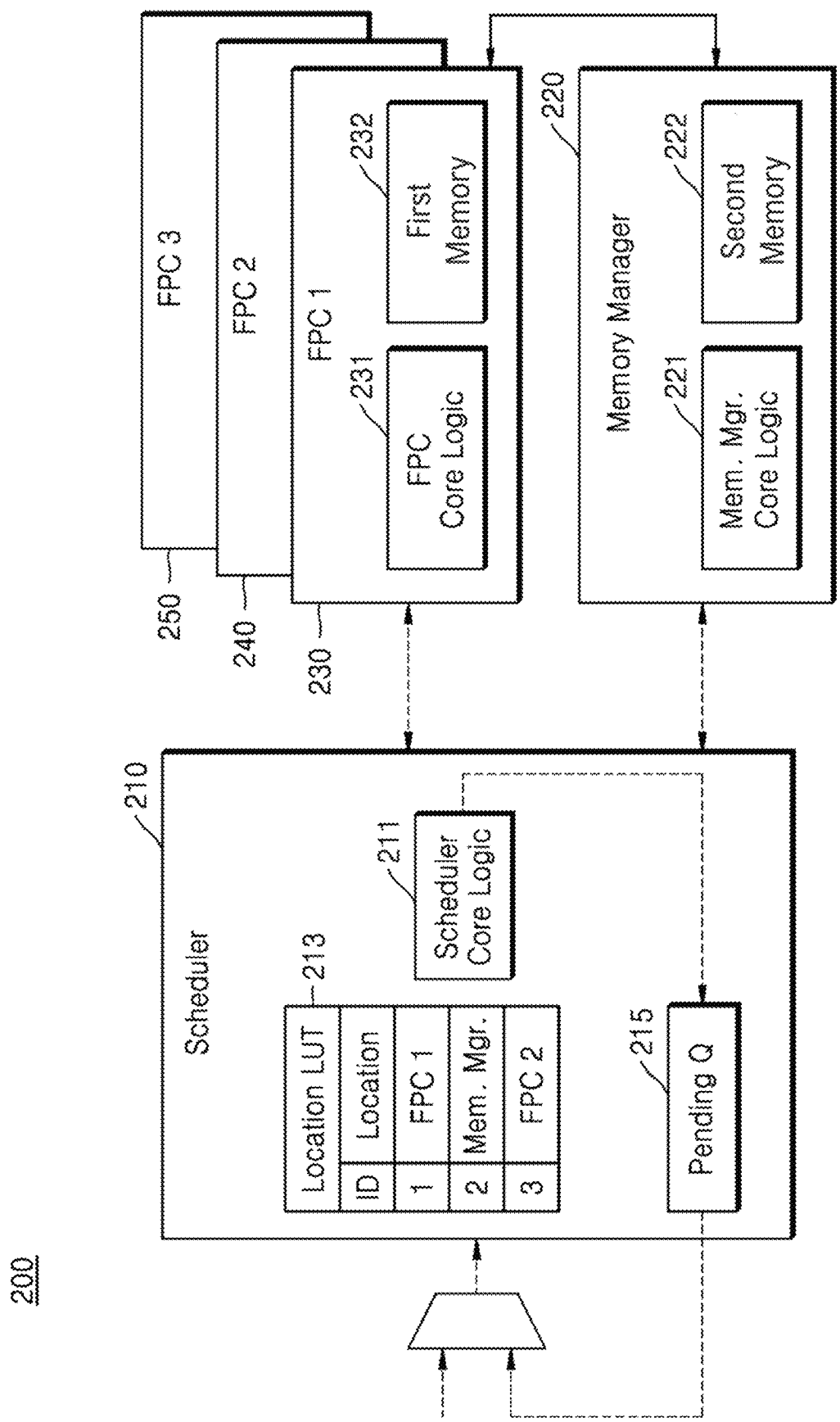
FIG. 2 is a view schematically illustrating operations of each block of a network interface device according to an example embodiment of the present disclosure.

FIG. 2 is a view schematically illustrating operations of each block of a network interface device according to an example embodiment of the present disclosure.

According to an example embodiment of the present disclosure, a network interface device 200 of FIG. 2 may be an electronic device corresponding to the network interface device 100 of FIG. 1. In the operation of the network interface device 200 described in FIG. 2, portions that are duplicative of those described in FIG. 1 may be omitted.

Referring to FIG. 2, the network interface device 200 may include a scheduler 210, a memory manager 220, and at least one FPC 230, 240, or 250. According to an example embodiment of the present disclosure, the at least one FPC 230, 240, or 250 may correspond to the at least one TCP controller 130, 140, or 150 of FIG. 1 and may be interchangeably disclosed.

According to an example embodiment of the present disclosure, the scheduler 210 may include a scheduler core logic 211, a location reference table 213, and a pending queue 215. The scheduler core logic 211 may perform various operations of the scheduler 210, such as storing TCP connection information and a TCP event in a location reference table 213 and a pending queue 215, respectively or controlling them. Thus, according to an example embodiment of the present disclosure, performing operations by the scheduler 210 may be disclosed interchangeably with performing operations by the scheduler core logic 211.

According to an example embodiment of the present disclosure, the memory manager 220 may include a memory manager core logic 221 and a second memory 222. The second memory 222 may include various types of large-capacity memory, including, but not limited to, a dynamic random access memory (DRAM) and a high bandwidth memory (HBM). The memory manager core logic 221 may perform various operations of the memory manager 220, such as storing TCP connection information in the second memory 222 and controlling it. Thus, according to an example embodiment of the present disclosure, performing operations by the memory manager 220 may be disclosed interchangeably with performing operations by the memory manager core logic 221.

According to an example embodiment of the present disclosure, the at least one FPC 230, 240, or 250 may each include an FPC core logic 231 and a first memory 232. The first memory 232 may include various types of high-speed or high-performance memory, including, but not limited to, a static random access memory (SRAM). Each of the FPC core logic may perform various operations of the FPC 230, 240, or 250, such as storing TCP connection information in the respective first memory and controlling it. Thus, according to an example embodiment of the present disclosure, performing operations by the FPC 230, 240, or 250 may be disclosed interchangeably with performing operations by the respective FPC core logic.

According to an example embodiment of the present disclosure, the memory manager 220 may store TCP connection information indicating TCP connection status in the second memory 222 which is controlled by the memory manager 220. The memory manager 220 may obtain the TCP event from the scheduler 210 when the TCP event occurs, and may generate or update the TCP connection information corresponding to the TCP event. The TCP connection information will be described in detail below with reference to Table 1. The TCP event may include a user call event, a reception event, and a timer event.

According to an example embodiment of the present disclosure, the memory manager 220 may determine whether it is necessary to perform TCP operations based on the generated or updated TCP connection information. When it is determined that the TCP operations is required to perform, the memory manager 220 may initiate a procedure to move the corresponding TCP connection information to an FPC among the at least one FPC 230, 240, or 250. The memory manager 220 may initiate the moving procedure by transmitting a swapping request signal to the scheduler 210.

According to an example embodiment of the present disclosure, the at least one FPC 230, 240, or 250 may store TCP connection information indicating a TCP connection state in a first memory which is controlled by the at least one FPC 230, 240, or 250. The TCP connection information stored in the first memory may include at least one TCP connection information that has been moved (swapping-in) from the second memory 222 by control of the memory manager 220 to perform TCP operations as described above. According to an example embodiment of the present disclosure, the second memory 222 may maintain TCP connection information that has been moved to the at least one FPC 230, 240, or 250. Thus, the at least one TCP connection information stored in each first memory may be a part of the at least one TCP connection information stored in the second memory 222.

The at least one FPC 230, 240, or 250 may obtain TCP events from the scheduler 210 and may update the TCP connection information corresponding to the TCP event. The TCP connection information will be described in detail below with reference to Table 1. The TCP event may include a user call event, a reception event, and a timer event. The at least one FPC 230, 240, or 250 may control operations for the TCP connection information corresponding to the TCP event. The at least one FPC 230, 240, or 250 may update the TCP connection information to reflect the result of performing the TCP operations.

Referring to Table 1 below, the TCP connection information may include, but not be limited to, a setting category information, a TX category information, a congestion control category information, and a RX category information. It will be understood by persons skilled in the art that information may be added or deleted to the TCP connection information exemplified in Table 1, and that categories and entries may be configured and represented in various ways.

TABLE 1

| Category | Entry |
|---|---|
| Setting | Local IP |
|  | Local Port |
|  | Remote IP |

TABLE 1-continued

| Category | Entry |
| --- | --- |
|  | Remote Port |
|  | recvEce |
|  | sendEce |
| TX | SND. APP |
|  | SND.NXT |
|  | SND.UNA |
|  | SND.WND |
|  | countDupAck |
|  | Timeout |
|  | needProbe |
| Congestion Control | fastRetransmit |
|  | sendCwr |
|  | SND.CWND |
|  | SND.SSTHRESH |
| RX | RCV.NXT |
|  | RCV.APP |

According to an example embodiment of the present disclosure, the setting category information may include information for identifying a TCP connection. The Setting category information may include, but not limited to, a Local IP, a Local Port, a Remote IP, a Remote Port, a recvEce, and a sendEce information. For example, the Local/Remote IP/Port information may indicate IP and Port of a local endpoint and a remote endpoint of a TCP connection, respectively. The recvEce and sendEce information may indicate whether an ECN-Echo bit indicating an Explicit Congestion Notification was received from the remote and whether the ECN-Echo bit was sent to the remote, respectively.

According to an example embodiment of the present disclosure, the TX category information may include, but not limited to, an SND.APP, an SND.NXT, an SND.UNA, an SND.WND, a countDupAck, a Timeout, and a needProbe information. For example, the SND.APP information may indicate a sequence number that the application will transmit next time. The SND.NXT information may indicate a sequence number that the network interface device 100 will transmit next time. The SND.UNA information may indicate an acknowledge number that will be received from the remote next time. The SND.WND information may indicate the size of a send window that the network interface device 100 may transmit, i.e., the size of data that may be transmitted at any point of time for a TCP connection. The countDupAck information may indicate the number of duplicate ACK. The Timeout information may indicate whether a retransmit timeout occurs. The needProbe information may indicate whether a probe packet is required.

According to an example embodiment of the present disclosure, an RX category information may include, but not limited to, an RCV.NXT and an RX.APP information. For example, the RX.APP information may indicate a sequence number that the application will receive next time. The RCV.NXT information may indicate a sequence number that the network interface device 100 will receive next time.

According to an example embodiment of the present disclosure, the congestion control category information may include information for performing congestion control operations. The congestion control category information may include, but not limited to, a fastRetransmit, a sendCwr, a SND.CWND, and a SND.SSTHRESH information. For example, the fastRetransmit information may indicate that a lost packet should be retransmitted quickly, even before a timer expires. The SND.CWND information may indicate the size of a congestion control window for a TCP connection. The sendCwr information may indicate decrease of the size of the congestion control window. The SND.SSTHRESH information may indicate a slow start threshold for the congestion control algorithm.

According to an example embodiment of the present disclosure, the scheduler 210 may schedule a TCP event. The scheduler 210 may forward the TCP event to the location based on a location reference table 213 that indicates the location of TCP connection information corresponding to the TCP event. The location may include at least one FPC 230, 240, or 250 configured to control a respective first memory and a memory manager 220 configured to control a second memory 222. Thus, the scheduler 210 may forward the TCP event to the TCP controller or memory manager 220 corresponding to the location.

According to an example embodiment of the present disclosure, the at least one FPC 230, 240, or 250 may obtain the TCP event from the scheduler 210. The at least one FPC 230, 240, or 250 may update TCP connection information corresponding to the TCP event. The at least one FPC 230, 240, or 250 may control operations for the TCP connection information corresponding to the TCP event. The at least one FPC 230, 240, or 250 may update the TCP connection information by reflecting the result of performing TCP operations.

According to an example embodiment of the present disclosure, the memory manager 220 may obtain the TCP event from the scheduler 210. The memory manager 220 may generate or update TCP connection information corresponding to the TCP event. The memory manager 220 may determine, based on the generated or updated TCP connection information, whether to perform TCP operations. For example, based on the updated TCP connection information, the memory manager 220 may determine that it is necessary to immediately perform TCP operations when the memory manager 220 determines that it is a situation where a TCP ACK or a TCP packet may be received by the receiver, but may determine that it is not necessary to immediately perform TCP operations when the memory manager 220 determines that it is a situation where a TCP ACK or a TCP packet may not be received by the receiver. When the memory manager 220 determines that TCP operations need to be performed, it may transmit a swapping request signal to the scheduler 210 requesting that the TCP connection information should be moved to one of the at least one TCP controller.

According to an example embodiment of the present disclosure, the scheduler 210 may count the number of TCP connection information stored in each first memory controlled by each FPC. In response to the swapping request signal obtained from the memory manager 220, the scheduler 210 may select one FPC (e.g., FPC 1) from among the at least one FPC. For example, the scheduler 210 may select FPC 1 having the smallest number of TCP connection information stored in the first memory from among the at least one FPC. In addition, it will be understood by persons skilled in the art that the selection algorithm may include a variety of non-limiting methods, such as random selection, round robin selection, and selection based on FPC number (e.g., smallest number).

According to an example embodiment of the present disclosure, the scheduler 210 may transmit a swapping-in request signal to the memory manager 220 requesting to move the TCP connection information to the first memory controlled by the selected FPC (e.g., FPC 1). The scheduler 210 may change the location of the TCP connection information in the location reference table 213 to information indicating that it is being moved.

According to an example embodiment of the present disclosure, the memory manager 220 may be configured to move the TCP connection information to the first memory controlled by the selected FPC (e.g., FPC 1) in response to a swapping-in request signal.

According to an example embodiment of the present disclosure, when the movement of the TCP connection information to the first memory is complete, the selected FPC (e.g., FPC 1) may transmit a swapping-in completion signal to the scheduler 210.

According to an example embodiment of the present disclosure, the scheduler 210 may obtain the swapping-in completion signal from the FPC 1. The scheduler 210 may change the location of the TCP connection information to the FPC 1.

Figure 3:
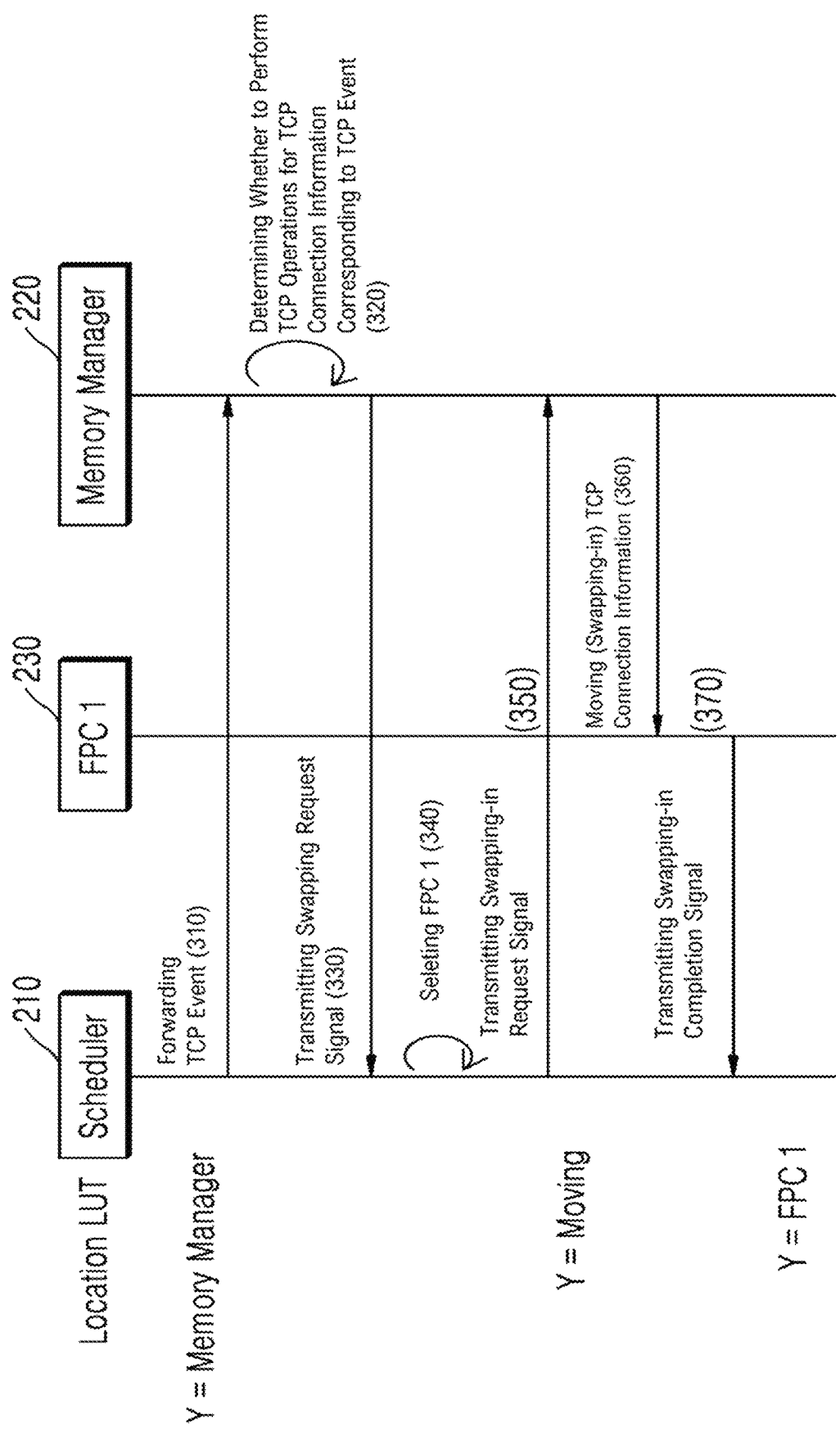
FIG. 3 is a flow diagram schematically illustrating operations of moving TCP connection information from a memory manager to an FPC (swapping-in) according to an example embodiment of the present disclosure.

FIG. 3 is a flow diagram schematically illustrating operations of moving TCP connection information from a memory manager to an FPC (swapping-in) according to an example embodiment of the present disclosure.

According to an example embodiment of the present disclosure, the scheduler 210, the FPC 1 230, and the memory manager 220 of FIG. 3 may correspond to the scheduler 110, the TCP controller 1 130, and the memory manager 120 of FIG. 1, respectively. In the operations of the scheduler 210, the FPC 1 230, and the memory manager 220 described in FIG. 3, portions that are duplicative of those described in FIGS. 1 and 2 may be omitted. Some of the operations illustrated in FIG. 3 may be omitted, and operations not illustrated in FIG. 3 may be added.

According to an example embodiment of the present disclosure, the location reference table 213 may include location information indicating that TCP connection information corresponding to a TCP connection Y is stored in the second memory 222 controlled by the memory manager 220. The second memory 222 may include various types of large-capacity memory, including, but not limited to, a dynamic random access memory (DRAM) and a high bandwidth memory (HBM).

According to an example embodiment of the present disclosure, the scheduler 210 may schedule a TCP event.

According to an example embodiment of the present disclosure, in an operation 310, the scheduler 210 may forward the TCP event corresponding to the TCP connection Y to the memory manager 220 based on the location reference table 213.

According to an example embodiment of the present disclosure, the memory manager 220 may obtain the forwarded TCP event and may generate or update TCP connection information corresponding to the TCP connection Y.

According to an example embodiment of the present disclosure, in an operation 320, the memory manager 220 may determine whether to perform TCP operations for the TCP connection Y corresponding to the TCP event based on the generated or updated TCP connection information.

When it is determined that it is necessary to perform TCP operations, according to an example embodiment of the present disclosure, in an operation 330, the memory manager 220 may transmit a swapping request signal to the scheduler 210 requesting to move the TCP connection information corresponding to the TCP connection Y to one FPC among the at least one of the FPC.

According to an example embodiment of the present disclosure, in an operation 340, the scheduler 210 may select the FPC 1 230 in response to the swapping request signal obtained from the memory manager 220. For example, the scheduler 210 may select, from among the at least one FPC, the FPC 1 230 having the smallest number of TCP connection information stored in the first memory. The first memory may include various types of high-speed or high-performance memory including, but not limited to, a static random access memory (SRAM). In addition, it will be understood by persons skilled in the art that the selection algorithm may include a variety of non-limiting methods, such as a random selection, a round robin selection, and a selection based on FPC number (e.g., smallest number).

According to an example embodiment of the present disclosure, in an operation 350, the scheduler 210 may transmit a swapping-in request signal to the memory manager 220 requesting that the TCP connection information corresponding to TCP connection Y should be moved to the first memory 232 controlled by the selected FPC 1 230. The scheduler 210 may change the location of the TCP connection information corresponding to the TCP connection Y in the location reference table 213 to information indicating that it is being moved (e.g., "Moving").

According to an example embodiment of the present disclosure, the scheduler 210 may store the TCP event in the pending queue 115 when the TCP event that is to be performed is a TCP event for the TCP connection Y. The TCP event input to the pending queue 115 may be output after a predetermined delay. When the TCP event is output from the pending queue 115 after the predetermined delay, the scheduler 210 may forward the TCP event to a location where the TCP connection information corresponding to the output TCP event is stored. If the TCP connection Y is still being moved, the scheduler 210 may store the TCP event back into the pending queue 115.

According to an example embodiment of the present disclosure, in an operation 360, the memory manager 220 may move (swapping-in) the TCP connection information to the first memory 232 controlled by the FPC 1 230 in response to the swapping-in request signal.

According to an example embodiment of the present disclosure, in an operation 370, when the movement of the TCP connection information to the first memory 232 is complete, the FPC 1 230 may transmit a swapping-in completion signal to the scheduler 210.

According to an example embodiment of the present disclosure, the scheduler 210 may change the location of the TCP connection information corresponding to the TCP connection Y to the FPC 1 230.

Figure 4:
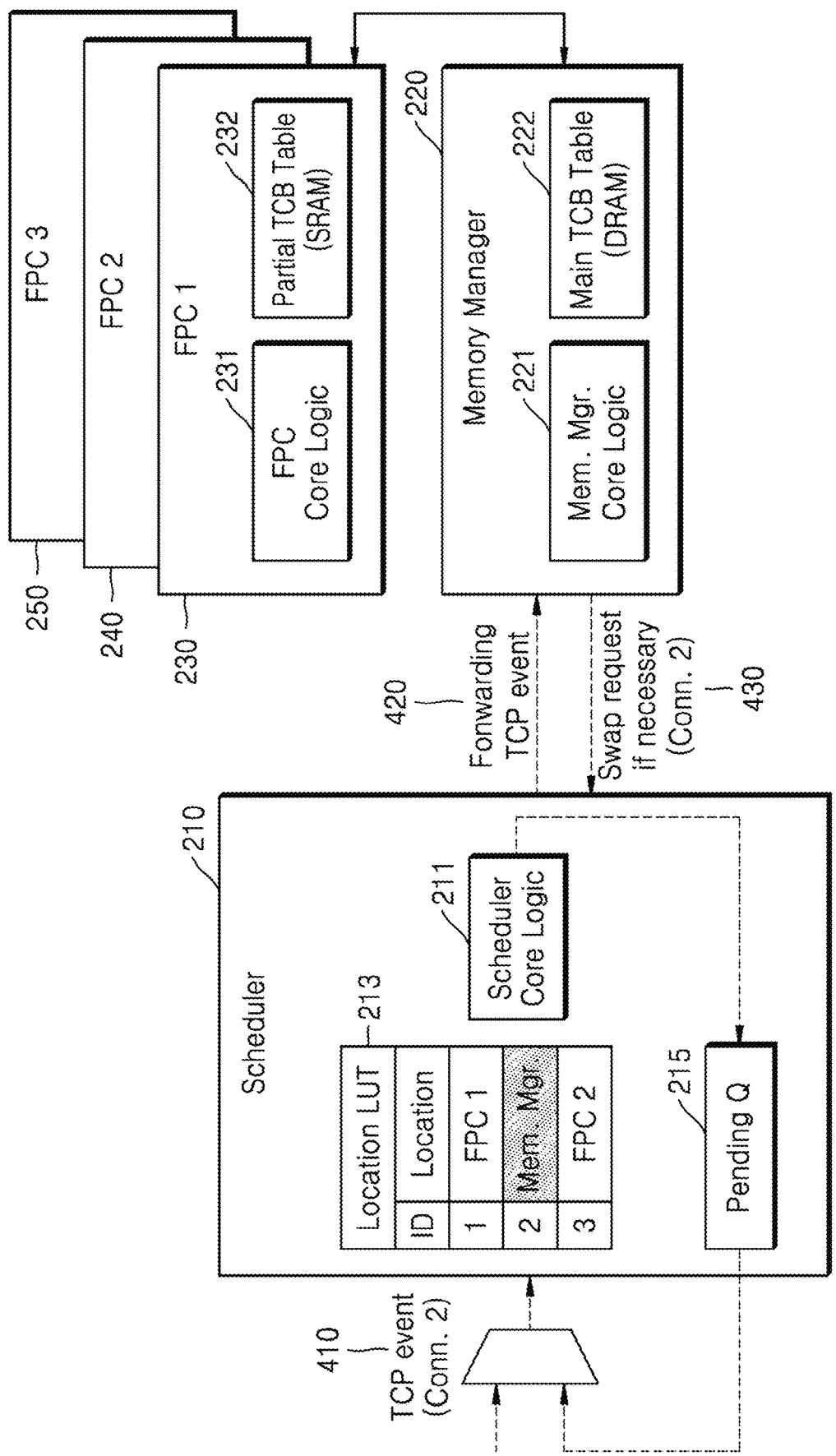
FIG. 4 is a flow diagram schematically illustrating operations of forwarding a TCP event to a memory manager based on a location reference table according to an example embodiment of the present disclosure.

FIG. 4 is a flow diagram schematically illustrating operations of forwarding a TCP event to a memory manager based on a location reference table according to an example embodiment of the present disclosure.

The scheduler 210, the FPC 230, 240, or 250, and the memory manager 220 disclosed herein with reference to FIGS. 4 through 9 may correspond to the scheduler 110, the TCP controller 130, 140, or 150, and the memory manager 120 of FIG. 1, respectively. The DRAM disclosed with reference to FIGS. 4 through 9 is shown as an exemplary embodiment of the second memory described above, and the second memory may include various types of large-capacity memory, including, but not limited to, a DRAM and an HBM. The SRAM disclosed with reference to FIGS. 4 through 9 is shown as an exemplary embodiment of the first memory described above, and the first memory may include various types of high-speed or high-performance memory, including, but not limited to, SRAM. In operations of the scheduler 210, the FPC 230, 240, or 250, and the memory manager 220 described with reference to FIGS. 4 through 9, portions that are duplicative of those described in FIGS. 1 through 3 may be omitted. Portions of the operations illustrated in FIGS. 4 through 9 may be omitted, and operations not illustrated in FIGS. 4 through 9 may be added.

According to an example embodiment of the present disclosure, in an operation 410, the scheduler 210 may schedule a TCP event. For example, the scheduler 210 may process a TCP event for a TCP connection 2 based on the above scheduling operation. Specifically, the scheduler 210 may obtain a location where TCP connection information corresponding to the TCP connection 2 is stored from the location reference table 213.

According to the location reference table 213, the TCP connection information corresponding to the TCP connection 2 is stored in the second memory 222 controlled by the memory manager 220, so in an operation 420 according to an example embodiment of the present disclosure, the scheduler 210 may forward the TCP event to the memory manager 220.

According to an example embodiment of the present disclosure, the memory manager 220 may obtain the TCP event from the scheduler 210. The memory manager 220 may generate or update TCP connection information corresponding to the TCP event stored in the second memory 222. Based on the generated or updated TCP connection information, the memory manager 220 may determine whether to perform TCP operations. For example, based on the updated TCP connection information, the memory manager 220 may determine that it is necessary to immediately perform TCP operations when the memory manager 220 determines that it is a situation where a TCP ACK or a TCP packet may be received by the receiver, but may determine that it is not necessary to immediately perform TCP operations when the memory manager 220 determines that it is a situation where a TCP ACK or a TCP packet may not be received by the receiver.

When the memory manager 220 determines that it is necessary to perform TCP operations, in an operation 430 according to an example embodiment of the present disclosure, the memory manager 220 may transmit a swapping request signal to the scheduler 210 requesting the TCP connection information corresponding to the TCP connection 2 should be moved to the first memory controlled by one FPC among the at least one FPC 230, 240, or 250.

Figure 5:
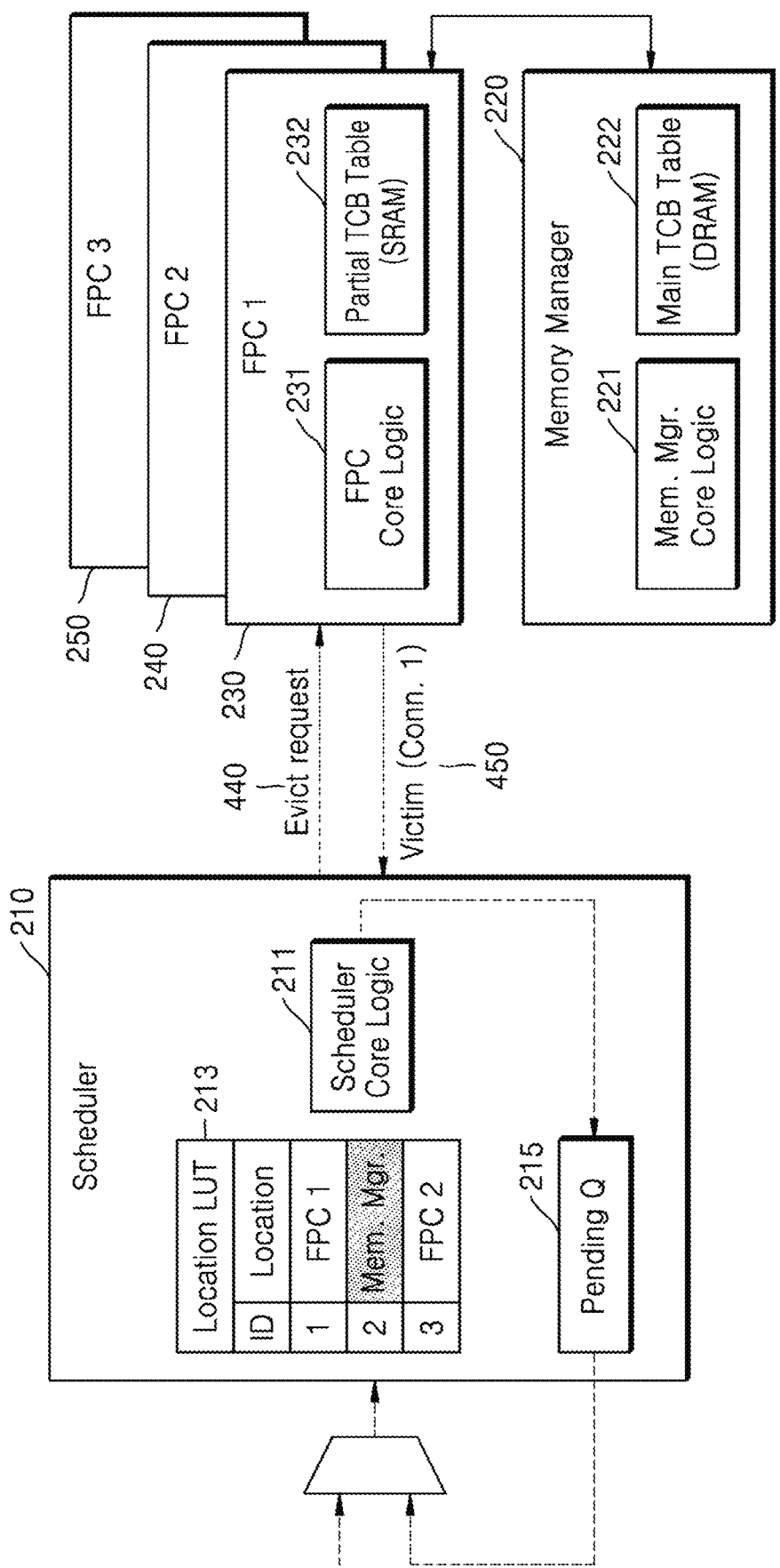
FIG. 5 is a flow diagram schematically illustrating operations of obtaining TCP connection information to be evicted from a selected FPC when the number of TCP connection information stored in each first memory is a predetermined maximum value according to an example embodiment of the present disclosure.

FIG. 5 is a flow diagram schematically illustrating operations of obtaining TCP connection information to be evicted from a selected FPC when the number of TCP connection information stored in each first memory is a predetermined maximum value according to an example embodiment of the present disclosure.

According to an example embodiment of the present disclosure, the scheduler 210 may count the number of TCP connection information stored in each first memory controlled by each FPC. If the number of TCP connection information stored in each of the first memories is all of a predetermined maximum value, the scheduler 210 may select FPC 1 230 as the FPC to evict the TCP connection information to the second memory 222 from among the at least one FPC in response to the swapping request signal. The predetermined maximum value may be set in advance based on the size of the first memory, etc. For example, the scheduler 210 may select the FPC to be evicted in a variety of non-limiting methods, such as a selection of the FPC that reaches a predetermined maximum value first, a random selection, a round robin selection, and a selection based on FPC number (e.g., smallest number).

According to an example embodiment of the present disclosure, in an operation 440, the scheduler 210 may transmit an eviction request signal to the selected FPC 1 230.

According to an example embodiment of the present disclosure, in response to the eviction request signal, the FPC 1 230 may select TCP connection information corresponding to a TCP connection 1 as TCP connection information to be evicted. For example, the FPC 1 230 may select the TCP connection information corresponding to the TCP connection 1 whose last received packet is the oldest. In addition, it will be understood by persons skilled in the art that the TCP connection information to be evicted may be selected in a variety of non-limiting methods, such as a random selection, a round robin selection, and a selection based on TCP connection priority.

According to an example embodiment of the present disclosure, in an operation 450, the FPC 1 230 may transmit information indicating the TCP connection 1 to the scheduler 210.

Figure 6:
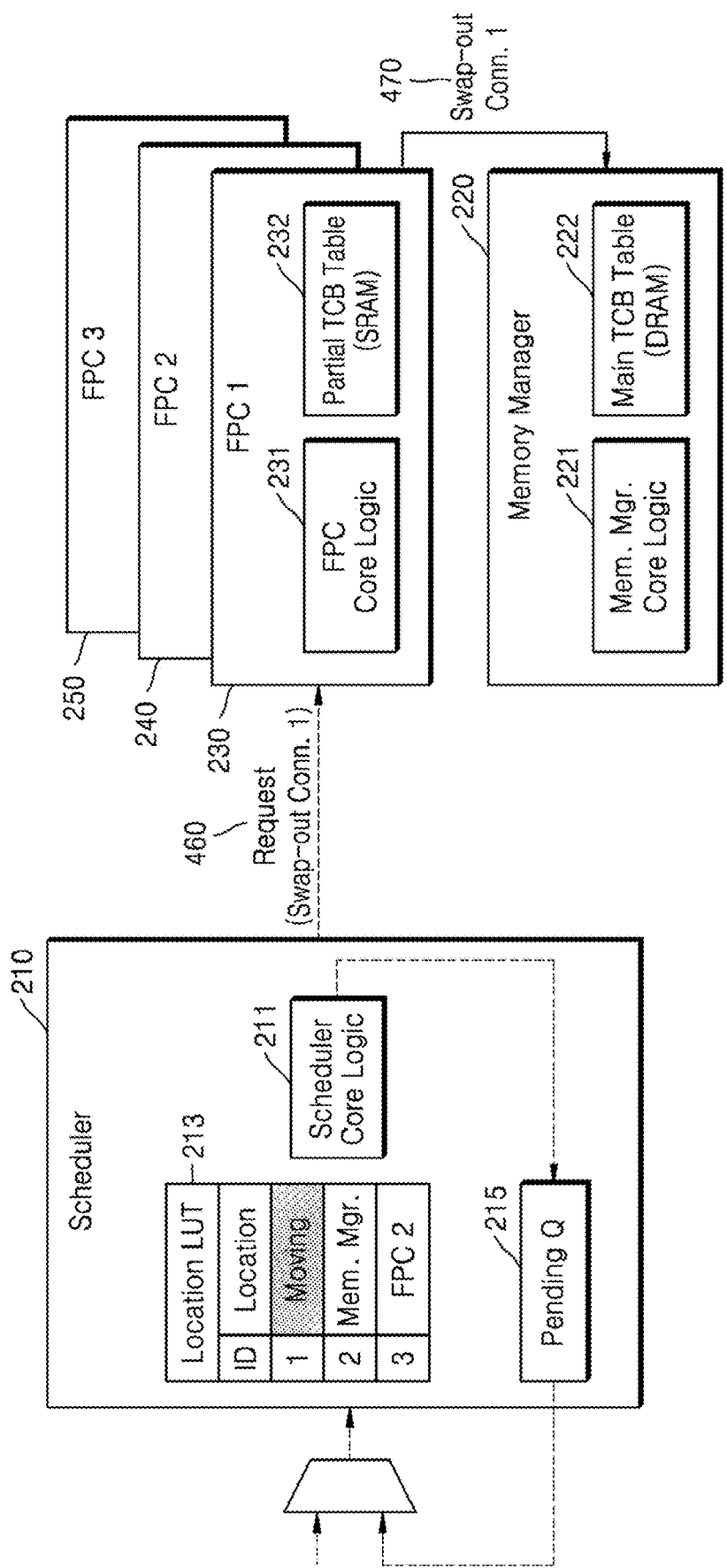
FIG. 6 is a flow diagram schematically illustrating operations of moving (swapping-out) TCP connection information to a second memory according to an example embodiment of the present disclosure.

FIG. 6 is a flow diagram schematically illustrating operations of moving (swapping-out) TCP connection information to a second memory according to an example embodiment of the present disclosure.

According to an example embodiment of the present disclosure, in an operation 460, the scheduler 210 may transmit a swapping-out request signal to the FPC 1 230 requesting the TCP connection information corresponding to the TCP connection 1 should be moved to the second memory 222. The scheduler 210 may change the location of the TCP connection information corresponding to the TCP connection 1 in the location reference table 213 to information indicating that it is being moved. It will be understood by persons skilled in the art that the location update may be performed before or after transmitting the swapping-out request signal.

According to an example embodiment of the present disclosure, in an operation 470, the FPC 1 230 may move the TCP connection information corresponding to the TCP connection 1 to the second memory 222 in response to the swapping-out request signal.

Figure 7:
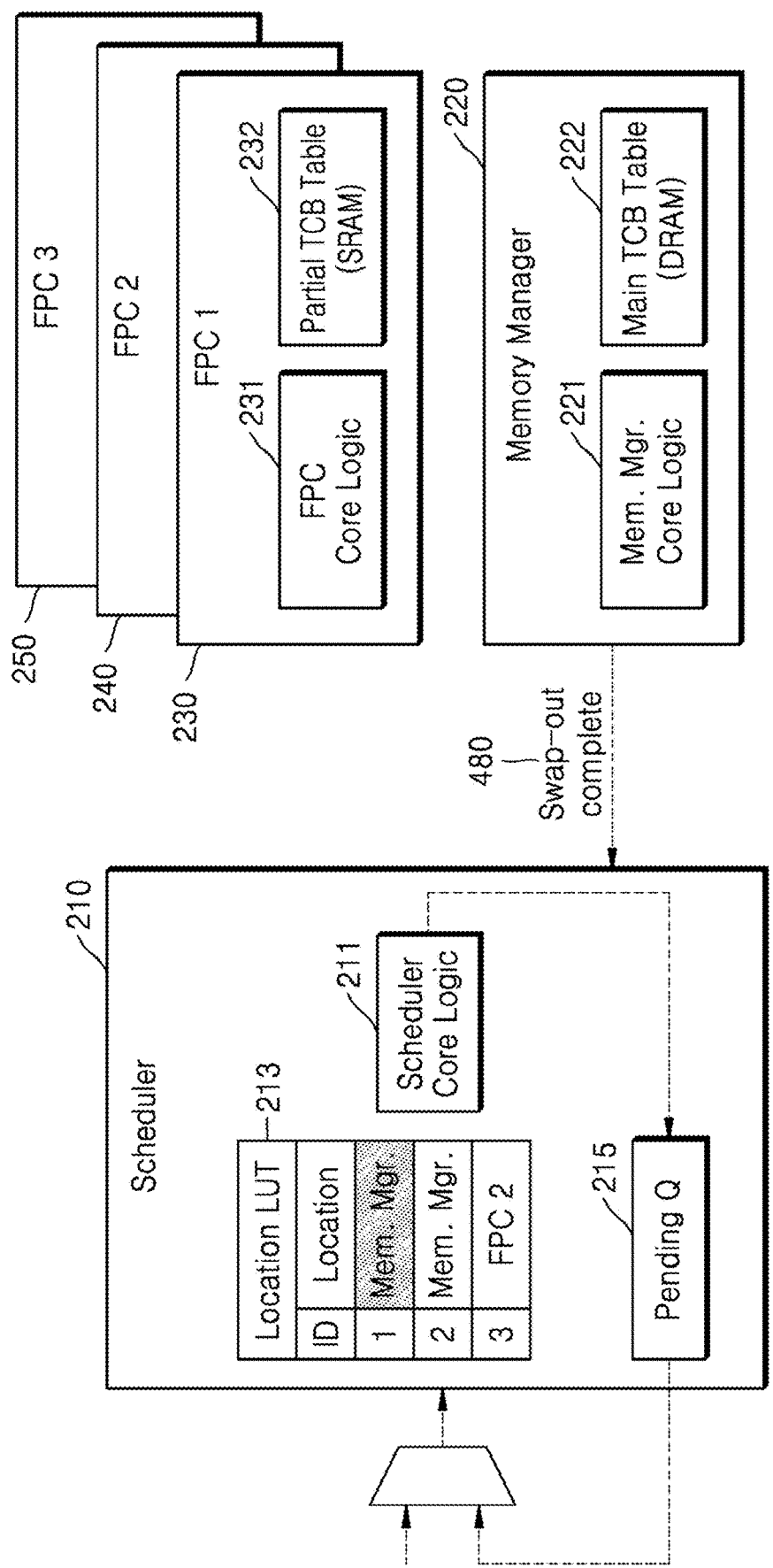
FIG. 7 is a flow diagram schematically illustrating operations of obtaining an eviction completion signal from a memory manager according to an example embodiment of the present disclosure.

FIG. 7 is a flow diagram schematically illustrating operations of obtaining an eviction completion signal from a memory manager according to an example embodiment of the present disclosure.

When the movement of the TCP connection information corresponding to TCP connection 1 to the second memory 222 is complete, in an operation 480 according to an example embodiment of the present disclosure, the memory manager 220 may transmit an eviction completion signal to the scheduler 210.

According to an example embodiment of the present disclosure, the scheduler 210 may change the location of the TCP connection information corresponding to the TCP connection 1 in the location reference table 213 to information indicating the memory manager 220.

Figure 8:
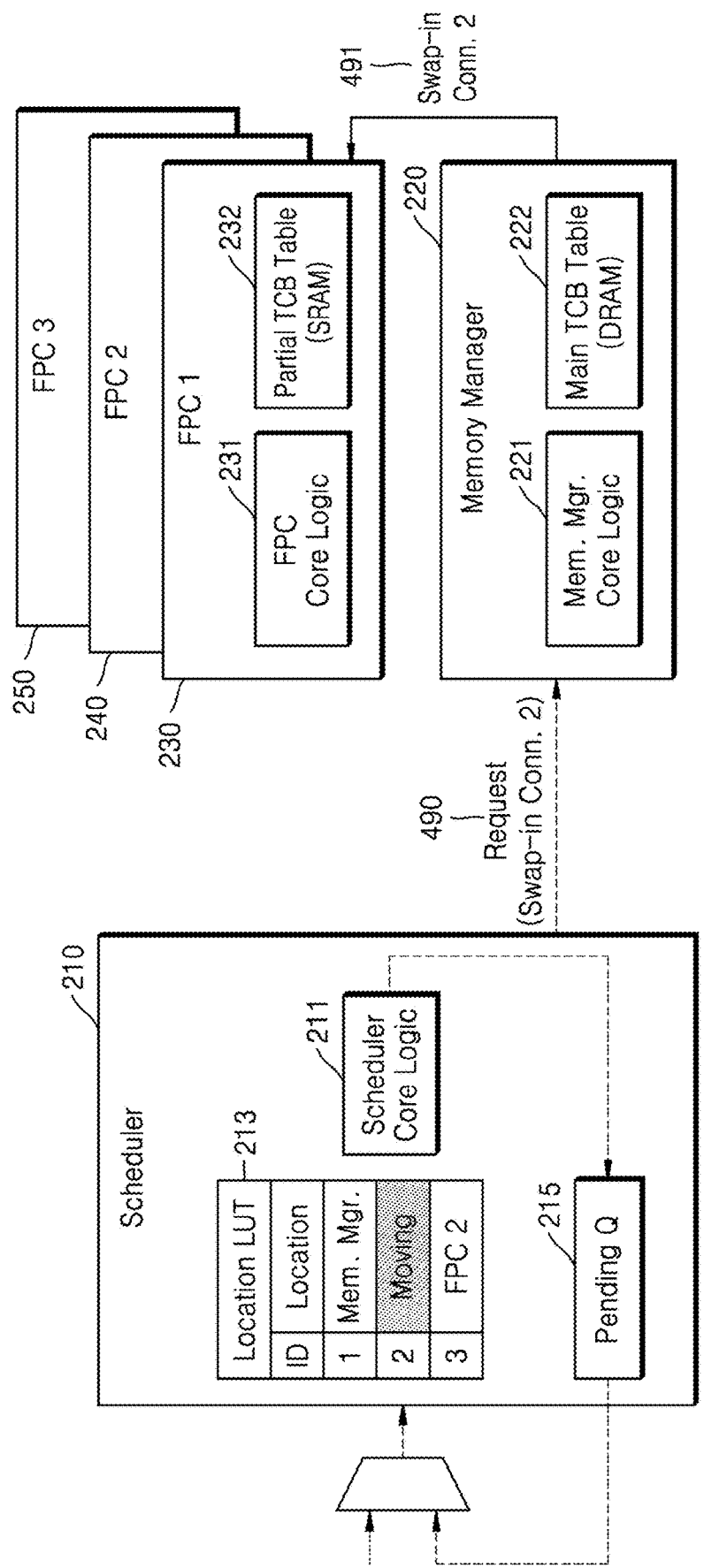
FIG. 8 is a flow diagram schematically illustrating operations of moving (swapping-in) TCP connection information corresponding to TCP connection 2 to a first memory controlled by FPC 1 according to an example embodiment of the present disclosure.

FIG. 8 is a flow diagram schematically illustrating operations of moving (swapping-in) TCP connection information corresponding to TCP connection 2 to a first memory controlled by FPC 1 according to an example embodiment of the present disclosure.

According to an example embodiment of the present disclosure, in an operation 490, the scheduler 210 may transmit a swapping-in request signal to the memory manager 220 requesting the TCP connection information corresponding to the TCP connection 2 should be moved to the first memory 232 controlled by the FPC 1 230. The scheduler 210 may change the location of the TCP connection information corresponding to the TCP connection 2 in the location reference table 213 to information indicating that it is being moved. It will be understood by persons skilled in the art that the location update may be performed before or after transmitting the swapping-in request signal.

According to an example embodiment of the present disclosure, in an operation 491, the memory manager 220 may, in response to the swapping-in request signal, move the TCP connection information corresponding to the TCP connection 2 to the first memory 232 controlled by the FPC 1 230.

Figure 9:
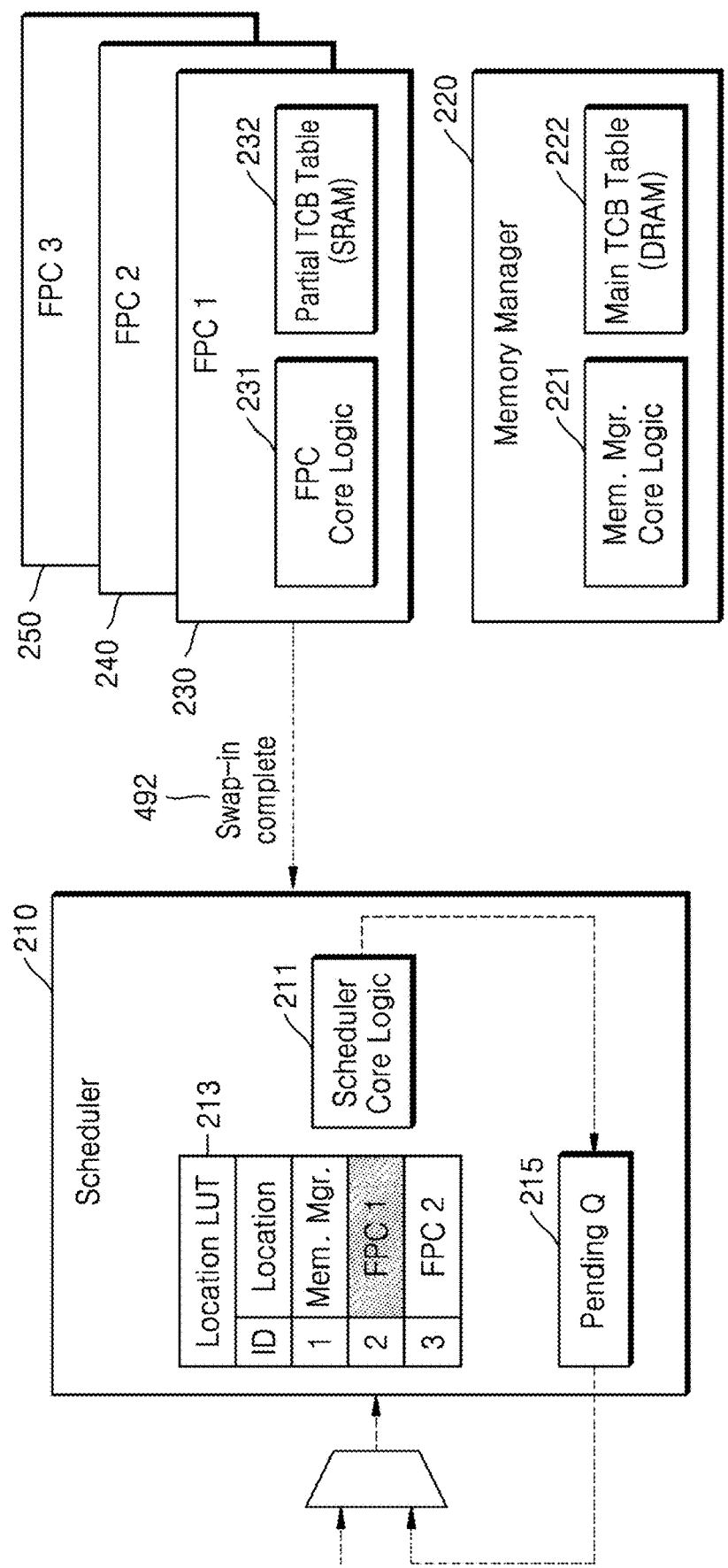
FIG. 9 is a flow diagram schematically illustrating operations of obtaining a swapping-in completion signal from FPC 1 according to an example embodiment of the present disclosure.

FIG. 9 is a flow diagram schematically illustrating operations of obtaining a swapping-in completion signal from FPC 1 according to an example embodiment of the present disclosure.

When the movement of the TCP connection information corresponding to the TCP connection 2 to the first memory 232 controlled by the FPC 1 230 is complete, in an operation 492 according to an example embodiment of the present disclosure, the FPC 1 230 may transmit a swapping-in completion signal to the scheduler 210. According to an example embodiment of the present disclosure, the scheduler 210 may change the location of the TCP connection information corresponding to the TCP connection 2 in the location reference table 213 to information indicating the FPC 1 230.

Figure 10:
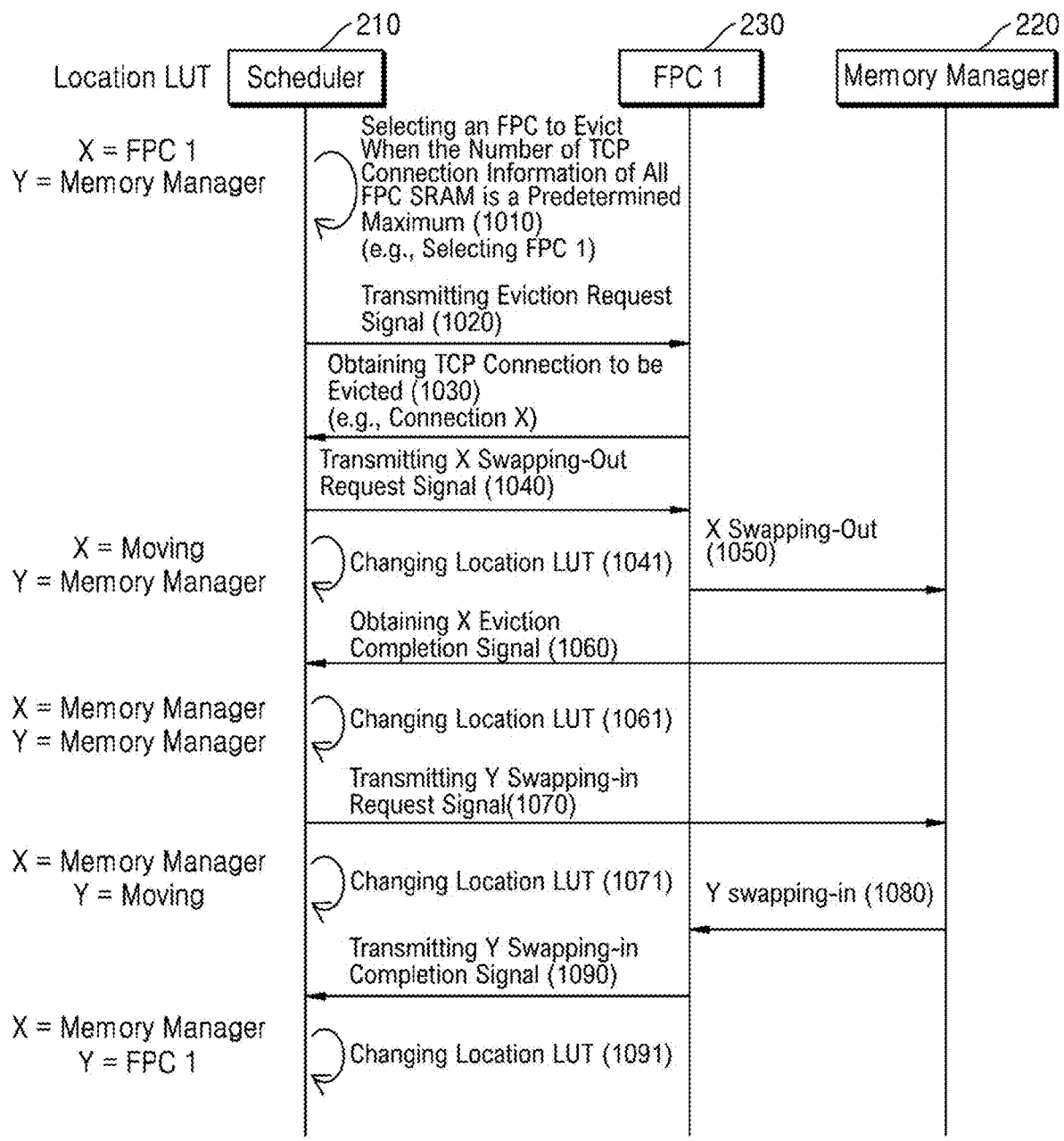
FIG. 10 is a flow diagram illustrating operations of a network interface device according to an example embodiment of the present disclosure.

FIG. 10 is a flow diagram illustrating operations of an electronic device according to an example embodiment of the present disclosure.

The scheduler 210, the FPC 1 230, and the memory manager 220 disclosed with reference to FIG. 10 may correspond to the scheduler 110, the TCP controller 1 130, and the memory manager 120 of FIG. 1, respectively. In operations of the scheduler 210, the FPC 1 230, and the memory manager 220 described with reference to FIG. 10, portions that are duplicative of those described in FIGS. 1 through 9 may be omitted. Some of the operations illustrated in FIG. 10 may be omitted, and operations not illustrated in FIG. 10 may be added.

According to an example embodiment of the present disclosure, the electronic device may schedule a TCP event by the scheduler 210. The scheduler 210 may process a TCP event for a TCP connection based on the scheduling operation. For example, the scheduler 210 may obtain a location in the location reference table 213 where the TCP connection information corresponding to the TCP connection Y is stored. According to the location reference table 213, the TCP connection information corresponding to the TCP connection Y is stored in the second memory 222 controlled by the memory manager 220, so the scheduler 210 may forward the TCP event to the memory manager 220. The second memory 222 may include various types of large-capacity memory, including, but not limited to, a dynamic random access memory (DRAM) and a high bandwidth memory (HBM).

According to an example embodiment of the present disclosure, the electronic device may obtain the TCP event from the scheduler 210 by the memory manager 220. The memory manager 220 may generate or update the TCP connection information corresponding to the TCP connection Y, stored in the second memory 222. Based on the generated or updated TCP connection information, the memory manager 220 may determine whether to perform TCP operations. When the memory manager 220 determines that it is necessary to perform TCP operations, the memory manager 220 may transmit a swapping request signal to the scheduler 210 requesting the TCP connection information corresponding to the TCP connection Y should be moved to the first memory controlled by one FPC among the at least one of the FPC 230, 240, or 250. The first memory may include various types of high-speed or high-performance memory including, but not limited to, a static random access memory (SRAM).

According to an example embodiment of the present disclosure, the electronic device may count the number of TCP connection information stored in each of the first memory controlled by each of the FPC by the scheduler 210. If the number of TCP connection information stored in each first memory is all of a predetermined maximum value, in an operation 1010 according to an example embodiment of the present disclosure, the electronic device may, by the scheduler 210, select FPC 1 230 as the FPC to evict the TCP connection information to the second memory 222 from among the at least one FPC.

In an operation 1020, according to an example embodiment of the present disclosure, the electronic device may, by the scheduler 210, transmit an eviction request signal to the FPC 1 230.

According to an example embodiment of the present disclosure, in response to the eviction request signal, the FPC 1 230 may select the TCP connection information corresponding to a TCP connection X as the TCP connection information to be evicted.

In an operation 1030, according to an example embodiment of the present disclosure, the electronic device may transmit the information indicating the TCP connection X by the FPC 1 230 to the scheduler 210.

In an operation 1040, according to an example embodiment of the present disclosure, the electronic device may transmit a swapping-out request signal to the FPC 1 230 requesting the TCP connection information corresponding to the TCP connection X should be moved to the second memory 222 by the scheduler 210.

In an operation 1041, according to an example embodiment of the present disclosure, the electronic device may, by the scheduler 210, change the location of the TCP connection information corresponding to the TCP connection X in the location reference table 213 to information indicating that it is being moved. It will be understood by persons skilled in the art that the location update may be performed before or after transmitting the swapping-out request signal.

In an operation 1050, according to an example embodiment of the present disclosure, the electronic device may move the TCP connection information corresponding to the TCP connection X to the second memory 222 in response to the swapping-out request signal by the FPC 1 230.

When the movement of the TCP connection information corresponding to the TCP connection X to the second memory 222 is complete, in an operation 1060 according to an example embodiment of the present disclosure, the electronic device may transmit an eviction completion signal to the scheduler 210 by the memory manager 220.

In an operation 1061, according to an example embodiment of the present disclosure, the electronic device may, by the scheduler 210, change the location of the TCP connection information corresponding to the TCP connection X in the location reference table 213 to information indicating the memory manager 220.

In an operation 1070, according to an example embodiment of the present disclosure, the electronic device may, by the scheduler 210, transmit a swapping-in request signal to the memory manager 220 requesting the TCP connection information corresponding to a TCP connection Y should be moved to the first memory 232 controlled by the FPC 1 230.

In an operation 1071, according to an example embodiment of the present disclosure, the electronic device may, by the scheduler 210, change the location of the TCP connection information corresponding to the TCP connection Y in the location reference table 213 to information indicating that it is being moved. It will be understood by persons skilled in the art that the location update may be performed before or after transmitting the swapping-in request signal.

In an operation 1080, according to an example embodiment of the present disclosure, the electronic device may, in response to the swapping-in request signal by the memory manager 220, move the TCP connection information corresponding to the TCP connection Y to the first memory 232 controlled by the FPC 1 230.

When the movement of the TCP connection information corresponding to the TCP connection Y to the first memory 232 controlled by the FPC 1 230 is complete, in an operation 1090, according to an example embodiment of the present disclosure, the electronic device may transmit a swapping-in completion signal to the scheduler 210 by the FPC 1 230.

In an operation 1091, according to an example embodiment of the present disclosure, the electronic device may, by the scheduler 210, change the location of the TCP connection information corresponding to the TCP connection Y in the location reference table 213 to information indicating the FPC 1 230.

According to an example embodiment of the present disclosure, a network interface device may include: a scheduler configured to schedule a TCP event, and to forward the TCP event to the location based on a location reference table indicating a location of TCP connection information corresponding to the TCP event; at least one TCP controller configured to obtain the TCP event from the scheduler, and to control operations for the TCP connection information corresponding to the TCP event; and a memory manager configured to obtain the TCP event from the scheduler, to determine whether to perform TCP operations for the TCP connection information corresponding to the TCP event, and to transmit a swapping request signal to the scheduler requesting to move the TCP connection information to a TCP controller among the at least one of the TCP controllers based on the result of the determination.

According to an example embodiment of the present disclosure, the location may include the at least one TCP controller configured to control each of a first memory and a memory manager configured to control a second memory, wherein the first memory includes a static random access memory (SRAM), wherein the second memory includes a dynamic random access memory (DRAM).

According to an example embodiment of the present disclosure, the scheduler may forward the TCP event to a TCP controller or the memory manager corresponding to the location.

According to an example embodiment of the present disclosure, the scheduler may count the number of TCP connection information stored in the respective first memory controlled by the respective TCP controller.

According to an example embodiment of the present disclosure, the scheduler may select a first TCP controller from among the at least TCP controller, in response to the swapping request signal; transmit a swapping-in request signal to the memory manager requesting the TCP connection information to be moved to a first memory controlled by the first TCP controller; change the location of the TCP connection information in the location reference table to information indicating that the TCP connection information is being moved; obtain a swapping-in completion signal from the first TCP controller; and change the location of the TCP connection information to the first TCP controller.

According to an example embodiment of the present disclosure, the first TCP controller may be a TCP controller having the smallest number of the TCP connection information.

According to an example embodiment of the present disclosure, the memory manager may be configured to move the TCP connection information to a first memory controlled by the first TCP controller, in response to the swapping-in request signal.

According to an example embodiment of the present disclosure, the scheduler may selects a second TCP controller from among the at least one TCP controller to evict the TCP connection information to the second memory when the number of TCP connection information stored in each of the first memory is a predetermined maximum value; transmit an eviction request signal to the second TCP controller; obtain information from the second TCP controller indicating the second TCP connection to be evicted, in response to the eviction request signal; transmit a swapping-out request signal to the second TCP controller requesting the second TCP connection information corresponding to the second TCP connection to be moved to the second memory; and obtain an eviction completion signal from the memory manager, in response to the swapping-out request signal.

According to an example embodiment of the present disclosure, the second TCP controller may be configured to move the second TCP connection information to a second memory controlled by the memory manager, in response to the swapping-out request signal.

According to an example embodiment of the present disclosure, the scheduler may transmit a swapping-in request signal to the memory manager requesting the TCP connection information corresponding to the TCP event to be moved to a first memory controlled by the second TCP controller, in response to the eviction completion signal; change the location of the TCP connection information in the location reference table to information indicating that it is being moved; obtain a swapping-in completion signal from the second TCP controller, and change the location of the TCP connection information to the second TCP controller.

According to an example embodiment of the present disclosure, the scheduler may store the TCP event in a pending queue, when the location of the TCP connection information corresponding to the TCP events in the location reference table is information indicating that it is being moved; extract the TCP event from the pending queue after a predetermined time period; forward the TCP event to the location based on the location reference table indicating a location of TCP connection information corresponding to the extracted TCP event.

In addition, according to an example embodiment of the present disclosure, a method of operating an electronic device may include: scheduling a TCP event by a scheduler; forwarding the TCP event to the location based on a location reference table indicating a location of TCP connection information corresponding to the TCP event by the scheduler; obtaining the forwarded TCP event by at least one TCP controller or memory manager; controlling operations for the TCP connection information corresponding to the TCP event by the at least one TCP controller; determining whether to perform TCP operations for the TCP connection information corresponding to the TCP event by the memory manager; and transmitting a swapping request signal to the scheduler requesting to move the TCP connection information to a TCP controller among the at least one of the TCP controllers based on the result of the determination by the memory manager.

According to an example embodiment of the present disclosure, the location may include the at least one TCP controller configured to control each of a first memory and a memory manager configured to control a second memory, wherein the first memory includes a static random access memory (SRAM), wherein the second memory includes a dynamic random access memory (DRAM).

According to an example embodiment of the present disclosure, the method may further comprise: forwarding the TCP event to a TCP controller or the memory manager corresponding to the location by the scheduler.

According to an example embodiment of the present disclosure, the method may further comprise: counting the number of TCP connection information stored in the respective first memory controlled by the respective TCP controller by the scheduler.

According to an example embodiment of the present disclosure, the method may further comprise: by the scheduler; selecting a first TCP controller from among the at least TCP controller, in response to the swapping request signal; transmitting a swapping-in request signal to the memory manager requesting the TCP connection information to be moved to a first memory controlled by the first TCP controller; changing the location of the TCP connection information in the location reference table to information indicating that the TCP connection information is being moved; obtaining a swapping-in completion signal from the first TCP controller; and changing the location of the TCP connection information to the first TCP controller.

According to an example embodiment of the present disclosure, the first TCP controller may be a TCP controller having the smallest number of the TCP connection information.

According to an example embodiment of the present disclosure, the method may further comprise: moving the TCP connection information to a first memory controlled by the first TCP controller by the memory manager, in response to the swapping-in request signal.

According to an example embodiment of the present disclosure, the method may further comprise: by the scheduler; selecting a second TCP controller from among the at least one TCP controller to evict the TCP connection information to the second memory when the number of TCP connection information stored in each of the first memory is a predetermined maximum value; transmitting an eviction request signal to the second TCP controller; obtaining information from the second TCP controller indicating the second TCP connection to be evicted, in response to the eviction request signal; transmitting a swapping-out request signal to the second TCP controller requesting the second TCP connection information corresponding to the second TCP connection to be moved to the second memory; and obtaining an eviction completion signal from the memory manager, in response to the swapping-out request signal.

According to an example embodiment of the present disclosure, the method may further comprise: moving the second TCP connection information to a second memory controlled by the memory manager by the second TCP controller, in response to the swapping-out request signal.

According to an example embodiment of the present disclosure, the method may further comprise: by the scheduler; transmitting a swapping-in request signal to the memory manager requesting the TCP connection information corresponding to the TCP event to be moved to a first memory controlled by the second TCP controller, in response to the eviction completion signal; changing the location of the TCP connection information in the location reference table to information indicating that it is being moved; obtaining a swapping-in completion signal from the second TCP controller; and changing the location of the TCP connection information to the second TCP controller.

According to an example embodiment of the present disclosure, the method may further comprise: by the scheduler; storing the TCP event in a pending queue, when the location of the TCP connection information corresponding to the TCP events in the location reference table is information indicating that it is being moved; extracting the TCP event from the pending queue after a predetermined time period; and forwarding the TCP event to the location based on the location reference table indicating a location of TCP connection information corresponding to the extracted TCP event.

In addition, according to an example embodiment of the present disclosure, a computer-readable recording medium on which a program for performing the above methods is recorded may be included.

The electronic device according to various embodiments disclosed herein may be one of various types of electronic devices. The electronic devices may include, for example, a display device, a portable communication device (e.g., a smartphone), a computer device, a portable multimedia device, a portable medical device, a camera, a wearable device, a home appliance, or the like. The electronic devices according to an embodiment of the present disclosure are not limited to those described above.

The various embodiments and terms used herein are not intended to limit the technical features described herein to specific embodiments and should be understood to include various modifications, equivalents, or substitutes of the embodiment. For example, an element expressed in a singular should be understood as a concept including a plurality of elements unless the context clearly refers only the singular. It should be understood that the term 'and/or' as used herein is intended to encompass any and all possible combinations of one or more of the enumerated items. As used in the present disclosure, the terms such as 'comprise(s)', 'include(s)' 'have/has', 'configured of', etc. are only intended to designate that the features, components, parts, or combinations thereof described in the present disclosure exist, and the use of these terms is not intended to exclude the possibility of the presence or addition of one or more other features, components, parts, or combinations thereof. In this disclosure, each of the phrases such as "A or B", "at least one of A and B", "at least one of A or B", "A, B or C", "at least one of A, B and C", and "at least one of A, B, or C" may include any one of the items enumerated together in a corresponding one of the phrases, or all possible combinations thereof. Terms such as "the first", "the second", or "first", or "second" may be used simply to distinguish a corresponding component from another corresponding component, and do not limit the corresponding components in view of other aspect (e.g., importance or order).

The term "module" or "unit" used in various embodiments of the present disclosure may include a unit implemented in hardware, software, or firmware, or any combination thereof, and be used interchangeably with terms such as e.g., logic, logic block, part, component, or circuitry, for example. The module or unit may be a minimum unit or a part of the integrally configured component or the component that performs one or more functions. For example, according to an embodiment, the module or unit may be implemented in the form of an application-specific integrated circuit (ASIC).

The term "in case ~" used in various embodiments of the present disclosure, may be construed to refer, for example, to "when ~" or "when ~", or "in response to determining ~" or "in response to detecting ~", depending on the context. Similarly, the term "when it is determined that ~" or "when it is detected that ~" may be interpreted to refer, for example, to "upon determining ~" or "in response to determining ~", or "upon detecting ~" or "in response to detecting ~", depending on the context.

The program executed by the network interface device 100, 200 and an electronic device (e.g., server) including the network interface device 100, 200 described herein may be implemented as a hardware component, a software component, and/or a combination of the hardware component and the software component. The program may be executed by any system capable of executing computer readable instructions.

Software may include a computer program, codes, instructions, or a combination of one or more of these, and may configure a processing unit to perform operations as desired or command the processing unit independently or in combination (collectively). The software may be implemented as a computer program including instructions stored in a computer-readable storage medium. The computer-readable storage medium may include, for example, a magnetic storage medium (e.g., read-only memory (ROM), random-access memory (RAM), floppy disk, hard disk, and so on), an optically readable medium (e.g., CD-ROM, digital versatile disc (DVD), or the like) and so on. The computer-readable storage medium may be distributed among network-connected computer systems, so that the computer-readable code may be stored and executed in a distributed manner. The computer program may be distributed (e.g., downloaded or uploaded) by online, either via an application store (e.g. Play Store™) or directly between two user devices (e.g., smartphones). In the case of online distribution, at least a part of the computer program product may be temporarily stored or temporarily generated in a machine-readable storage medium such as a memory of a server of a manufacturer, a server of an application store, or a relay server.

According to various embodiments, each component (e.g., module or program) of the above-described components may include a singular or a plurality of entities, and some of the plurality of entities may be separated and placed into other components. According to various embodiments, one or more components or operations among the above-described corresponding components may be omitted, or one or more other components or operations may be added thereto. Alternatively or additionally, a plurality of components (e.g., a module or a program) may be integrated into one component. In this case, the integrated component may perform one or more functions of each component of the plurality of components identically or similarly to those performed by the corresponding component among the plurality of components prior to the integration. According to various embodiments, operations performed by a module, program, or other component may be executed sequentially, in parallel, repeatedly or heuristically, or one or more of the operations may be executed in a different order or omitted, or one or more other operations may be added thereto.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A network interface device comprising:
   a scheduler configured to schedule a TCP event, and to forward the TCP event to a location based on a location reference table indicating a location of TCP connection information corresponding to the TCP event;
   at least one TCP controller configured to obtain the TCP event from the scheduler, and to control TCP operations for the TCP connection information corresponding to the TCP event; and
   a memory manager configured to obtain the TCP event from the scheduler, to determine whether to perform the TCP operations for the TCP connection information corresponding to the TCP event, and to transmit a swapping request signal to the scheduler requesting to move the TCP connection information to a TCP controller among the at least one TCP controller based on a result of the determination.

2. The network interface device of claim 1,
   wherein the location includes the at least one TCP controller configured to control each of a first memory and a memory manager configured to control a second memory,
   wherein the first memory includes a static random access memory (SRAM),
   wherein the second memory includes a dynamic random access memory (DRAM).

3. The network interface device of claim 2,
   wherein the scheduler forwards the TCP event to a TCP controller of the at least one TCP controller or the memory manager corresponding to the location.

4. The network interface device of claim 2,
   wherein the scheduler counts the number of TCP connection information stored in the respective first memory controlled by the respective TCP controller.

5. The network interface device of claim 4,
   wherein the scheduler selects a first TCP controller from among the at least one TCP controller, in response to the swapping request signal,
   transmits a swapping-in request signal to the memory manager requesting the TCP connection information to be moved to the first memory controlled by the first TCP controller,
   changes the location of the TCP connection information in the location reference table to information indicating that the TCP connection information is being moved,
   obtains a swapping-in completion signal from the first TCP controller, and
   changes the location of the TCP connection information to the first TCP controller.

6. The network interface device of claim 5,
   wherein the first TCP controller is a TCP controller having the smallest number of the TCP connection information.

7. The network interface device of claim 5,
   wherein the memory manager is configured to move the TCP connection information to the first memory controlled by the first TCP controller, in response to the swapping-in request signal.

8. The network interface device of claim 4,
wherein the scheduler selects a second TCP controller from among the at least one TCP controller to evict the TCP connection information to the second memory when the number of TCP connection information stored in each of the first memory is a predetermined maximum value,
transmits an eviction request signal to the second TCP controller,
obtains information from the second TCP controller indicating a second TCP connection to be evicted, in response to the eviction request signal,
transmits a swapping-out request signal to the second TCP controller requesting second TCP connection information corresponding to the second TCP connection to be moved to the second memory, and
obtains an eviction completion signal from the memory manager, in response to the swapping-out request signal.

9. The network interface device of claim 8,
wherein the second TCP controller is configured to move the second TCP connection information to the second memory controlled by the memory manager, in response to the swapping-out request signal.

10. The network interface device of claim 8,
wherein the scheduler transmits a swapping-in request signal to the memory manager requesting the TCP connection information corresponding to the TCP event to be moved to the first memory controlled by the second TCP controller, in response to the eviction completion signal,
changes the location of the TCP connection information in the location reference table to information indicating that it is being moved,
obtains a swapping-in completion signal from the second TCP controller, and
changes the location of the TCP connection information to the second TCP controller.

11. The network interface device of claim 1,
wherein the scheduler stores the TCP event in a pending queue, when the location of the TCP connection information corresponding to the TCP events in the location reference table is information indicating that it is being moved,
extracts the TCP event from the pending queue after a predetermined time period,
forwards the TCP event to a location based on the location reference table indicating a location of TCP connection information corresponding to the extracted TCP event.

12. A method of operating an electronic device, the method comprising:
scheduling a TCP event by a scheduler;
forwarding the TCP event to a location based on a location reference table indicating a location of TCP connection information corresponding to the TCP event by the scheduler;
obtaining the forwarded TCP event by at least one TCP controller or memory manager;
controlling TCP operations for the TCP connection information corresponding to the TCP event by the at least one TCP controller;
determining whether to perform the TCP operations for the TCP connection information corresponding to the TCP event by the memory manager; and
transmitting a swapping request signal requesting the TCP connection information should be moved to a TCP controller of the at least one TCP controller based on a result of the determination by the memory manager to the scheduler.

13. The method of claim 12,
wherein the location includes the at least one TCP controller configured to control each of a first memory and a memory manager configured to control a second memory;
wherein the first memory includes a static random access memory (SRAM);
wherein the second memory includes a dynamic random access memory (DRAM).

14. The method of claim 13, further comprising:
forwarding the TCP event to the TCP controller or the memory manager corresponding to the location by the scheduler.

15. The method of claim 13, further comprising:
counting the number of TCP connection information stored in the respective first memory controlled by the respective TCP controller by the scheduler.

16. The method of claim 15, further comprising:
by the scheduler:
selecting a first TCP controller from among the at least one TCP controller, in response to the swapping request signal;
transmitting a swapping-in request signal to the memory manager requesting the TCP connection information to be moved to the first memory controlled by the first TCP controller;
changing the location of the TCP connection information in the location reference table to information indicating that the TCP connection information is being moved;
obtaining a swapping-in completion signal from the first TCP controller; and
changing the location of the TCP connection information to the first TCP controller.

17. The method of claim 16,
wherein the first TCP controller is a TCP controller having the smallest number of the TCP connection information.

18. The method of claim 16, further comprising:
moving the TCP connection information to the first memory controlled by the first TCP controller by the memory manager, in response to the swapping-in request signal.

19. The method of claim 15, further comprising:
by the scheduler:
selecting a second TCP controller from among the at least one TCP controller to evict the TCP connection information to the second memory when the number of TCP connection information stored in each of the first memory is a predetermined maximum value;
transmitting an eviction request signal to the second TCP controller;
obtaining information from the second TCP controller indicating a second TCP connection to be evicted, in response to the eviction request signal;
transmitting a swapping-out request signal to the second TCP controller requesting second TCP connection information corresponding to the second TCP connection to be moved to the second memory; and
obtaining an eviction completion signal from the memory manager, in response to the swapping-out request signal.

20. The method of claim 19, further comprising:
moving the second TCP connection information to the second memory controlled by the memory manager by the second TCP controller, in response to the swapping-out request signal;
by the scheduler:
transmitting a swapping-in request signal to the memory manager requesting the TCP connection information corresponding to the TCP event to be moved to the first memory controlled by the second TCP controller, in response to the eviction completion signal;
changing the location of the TCP connection information in the location reference table to information indicating that it is being moved;
obtaining a swapping-in completion signal from the second TCP controller; and
changing the location of the TCP connection information to the second TCP controller.

\* \* \* \* \*